(12) United States Patent
Cambronero Sánchez et al.

(10) Patent No.: US 12,705,434 B2
(45) Date of Patent: Aug. 11, 2026

(54) VISUAL CHAIN-OF-THOUGHT REASONING FOR MULTIMODAL LANGUAGE MODELS

(71) Applicant: Microsoft Technology Licensing, LLC, Redmond, WA (US)

(72) Inventors: José Pablo Cambronero Sánchez, Washington, DC (US); Mukul Singh, Delhi (IN); Sumit Gulwani, Sammamish, WA (US); Vu Minh Le, Redmond, WA (US); Gust Verbruggen, Keerbergen (BE)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 18/592,168

(22) Filed: Feb. 29, 2024

(65) Prior Publication Data

US 2025/0278573 A1 Sep. 4, 2025

(51) Int. Cl.

| | |
|---|---|
| ***G06F 40/40*** | (2020.01) |
| ***G06V 10/70*** | (2022.01) |
| ***G06V 10/94*** | (2022.01) |
| ***G06V 10/96*** | (2022.01) |

(52) U.S. Cl.

CPC ............ *G06F 40/40* (2020.01); *G06V 10/768* (2022.01); *G06V 10/955* (2022.01); *G06V 10/96* (2022.01)

(58) Field of Classification Search

USPC ................................................ 704/7–10, 257

See application file for complete search history.

(56) References Cited

U.S. PATENT DOCUMENTS

| | | | | |
|---|---|---|---|---|
| 12,051,205 | B1 * | 7/2024 | Deutsch | G06V 10/82 |
| 12,106,318 | B1 * | 10/2024 | Chiang | G06Q 30/016 |
| 2024/0362261 | A1 * | 10/2024 | Setlur | G06F 3/0482 |
| 2024/0386202 | A1 * | 11/2024 | Hoffman | G06F 40/30 |
| 2024/0386215 | A1 * | 11/2024 | Eisenschlos | G06F 40/40 |
| 2024/0428937 | A1 * | 12/2024 | Natarajan | G16H 50/20 |
| 2025/0094838 | A1 * | 3/2025 | Wei | G06N 3/096 |
| 2025/0111169 | A1 * | 4/2025 | Srinivasan | G06N 3/08 |
| 2025/0139188 | A1 * | 5/2025 | Heo | G06F 40/205 |
| 2025/0139385 | A1 * | 5/2025 | Holden | G06F 40/186 |
| 2025/0165718 | A1 * | 5/2025 | Seo | G06F 40/30 |

OTHER PUBLICATIONS

Singh, et al., "Assessing GPT4-V on Structured Reasoning Tasks", arXiv preprint arXiv:2312.11524, 2023, 9 Pages.

* cited by examiner

*Primary Examiner* — Leonard Saint-Cyr
(74) *Attorney, Agent, or Firm* — Novo TechIP International PLLC

(57) ABSTRACT

A multimodal assistant system receives a multimodal input that includes an input image and a natural language task description which describes a structured task to perform based on the input image. The system generates a visual Chain-of-Thought (v-CoT) prompt by combining the input image, the natural language task description, and a v-CoT instruction, the v-CoT instruction defining a series of steps for the MLLM to take in generating an output. The series of steps includes instructing the MLLM to describe relevant information derived from the image and relevant image artifacts required to generate the output, instructing the MLLM to reason over the relevant information and relevant image artifacts to determine a solution for the task, and including the solution in the output.

20 Claims, 8 Drawing Sheets

| Dataset | Tasks | Image | Task |
|---|---|---|---|
| ChartQA (test) | 302 | Chart | VQA |
| MathVista (testmini) | 200 | Diagram | VQA |
| ARC (test) | 80 | Blocks | Pattern |
| Spider (test) | 206 | Table | Code generation |

FIG. 6

| Approach | MathVista | ChartQA | ARC | Spider |
|---|---|---|---|---|
| Sphinx | 33.2 | 63.4 | 27.2 | - |
| InstructBlip | 24.7 | 54.5 | 23.4 | - |
| Blip2 | 23.1 | 31.4 | 22.6 | - |
| InstructBlip + CoT GPT-4 | 30.4 | 55.3 | 47.3 | 83.5 |
| InstructBlip + PoT GPT-4 | 30.8 | 56.4 | **51.2** | 82.7 |
| GPT-4 | - | - | - | 81.8 |
| GPT-4V | 47.5 | 75.6 | 31.2 | 84.3 |
| GPT-4V + v-CoT | **49.1** | **79.2** | 40.5 | **86.2** |

FIG. 7

VISUAL CHAIN-OF-THOUGHT REASONING FOR MULTIMODAL LANGUAGE MODELS

BACKGROUND

A multimodal large language model (MLLM) (also referred to as a large multimodal model (LMM)) is a type of artificial intelligence (AI) model that is designed to understand and generate content across multiple modalities, where a modality refers to a distinct form of communication or representation. In the context of MLLMs, the modalities typically include text, images, and sometimes other forms of data such as audio or video. MLLMs are effective at performing certain types of multimodal tasks, such as captioning images, object detection/identification, segmentation, and the like, which require comprehension of information from a single modality at a time and require the performance of a single step or a predetermined sequence of steps on image data to generate an output.

However, many multimodal tasks, such as structured reasoning tasks, are considerably more complex and require comprehension and integration of information from multiple modalities to generate an output. For example, a task may involve solving a math word problem based on information in a graph or chart. In this case, the model must comprehend and integrate information from the input text describing the problem and information from the image to solve the problem. Enabling MLLMs to perform such complex multimodal tasks has remained a challenge.

One method that has been used for unimodal (e.g., text to text) LLMs to improve performance on structured reasoning tasks is the integration of Chain-of-Thought (CoT) reasoning. CoT reasoning involves causing the model to solve a problem using a series of intermediate reasoning steps. The two primary ways of integrating CoT reasoning into LLMs include: (1) instruction fine-tuning and (2) prompt engineering. In various implementations, Instruction fine-tuning involves fine-tuning an LLM using machine-generated instruction-following data. While effective, instruction fine-tuning requires significant amounts of time, computing resources, and training data.

CoT prompt engineering is a technique that involves adding instructions to the text prompt for guiding an LLM to follow a reasoning process when dealing with complex problems. For example, it has been found that in some cases simply adding an instruction to "solve the problem step by step" can be enough to elicit CoT reasoning in LLMs. CoT prompting has been shown to improve LLM performance on a range of arithmetic, commonsense, and symbolic reasoning tasks. CoT prompt engineering avoids the costs associated with instruction fine-tuning in integrating CoT reasoning into unimodal (e.g., text-to-text) LLMs. However, the prompt engineering techniques used to integrate CoT reasoning into unimodal LLMs are not as effective when used in the multimodal context. For example, multimodal tasks require the integration of visual information which is not elicited by simply instructing a model to solve a problem step by step.

What is needed is a method of improving MLLM performance on structured reasoning tasks that does not suffer from the limitations associated with prior art methods.

SUMMARY

In one general aspect, the instant disclosure presents a multimodal assistant system having a processor and a memory in communication with the processor wherein the memory stores executable instructions that, when executed by the processor alone or in combination with other processors, cause the multimodal assistant system to perform multiple functions. The functions may include receiving a multimodal input at a user interface component of the multimodal assistant system, the multimodal input including an input image and a natural language task description which describes a structured task to perform based on the input image; generating a visual Chain-of-Thought (v-CoT) prompt for a multimodal Large Language Model (MLLM) of the multimodal assistant system using a prompt generating component, the prompt generating component generating the v-CoT prompt by combining the input image, the natural language task description, and a v-CoT instruction, the v-CoT instruction defining a series of steps for the MLLM to take in generating an output that solves the task conditioned on the input image and the natural language task description and that utilizes CoT reasoning, the series of steps including: instructing the MLLM to describe relevant information derived from the image and relevant image artifacts required to generate the output; instructing the MLLM to reason over the relevant information and relevant image artifacts to determine a solution for the task; and including the solution in the output; providing the v-CoT prompt to the MLLM as an input; receiving the output generated by the MLLM based on the v-CoT prompt; and presenting the output on the user interface for the multimodal assistant system.

In yet another general aspect, the instant disclosure presents a method of eliciting Chain-of-Thought (CoT) reasoning from a multimodal Large Language model (MLLM) of a multimodal assistant system. The method includes receiving a multimodal input at a user interface component of the multimodal assistant system, the multimodal input including an input image and a natural language task description which describes a structured task to perform based on the input image; generating a visual Chain-of-Thought (v-CoT) prompt for the MLLM of the multimodal assistant system using a prompt generating component, the prompt generating component generating the v-CoT prompt by combining the input image, the natural language task description, and a v-CoT instruction, the v-CoT instruction defining a series of steps for the MLLM to take in generating an output that solves the task conditioned on the input image and the natural language task description and that utilizes CoT reasoning, the series of steps including: instructing the MLLM to describe relevant information derived from the image and relevant image artifacts required to generate the output; instructing the MLLM to reason over the relevant information and relevant image artifacts to determine a solution for the task; and including the solution in the output; providing the v-CoT prompt to the MLLM as an input; receiving the output generated by the MLLM based on the v-CoT prompt; and presenting the output on the user interface for the multimodal assistant system.

In a further general aspect, the instant application describes a non-transitory computer readable medium on which are stored instructions that when executed cause a programmable device to perform functions of receiving a multimodal input at a user interface component of a multimodal assistant system, the multimodal input including an input image and a natural language task description which describes a structured task to perform based on the input image; generating a visual Chain-of-Thought (v-CoT) prompt for a multimodal Large Language Model (MLLM) of the multimodal assistant system using a prompt generating component that is configured to generate the v-CoT prompt by combining the input image, the natural language task description, and a v-CoT instruction, the v-CoT instruction defining a series of steps for the MLLM to take in generating an output that solves the task conditioned on the input image and the natural language task description and that utilizes CoT reasoning, the series of steps including: instructing the MLLM to describe relevant information derived from the image and relevant image artifacts required to generate the output; instructing the MLLM to reason over the relevant information and relevant image artifacts to determine a solution for the task; and including the solution in the output; feeding the v-CoT prompt to the MLLM as input; receiving the output generated by the MLLM based on the v-CoT prompt; and presenting the output on the user interface for the multimodal assistant system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 6 depicts a table that summarizes the four benchmarks used in evaluating multimodal LLM performance with v-CoT prompting.

FIG. 7 depicts a table that summarizes the results of the evaluation of the multimodal LLM performance across benchmarks and baselines.

DETAILED DESCRIPTION

Figure 1:
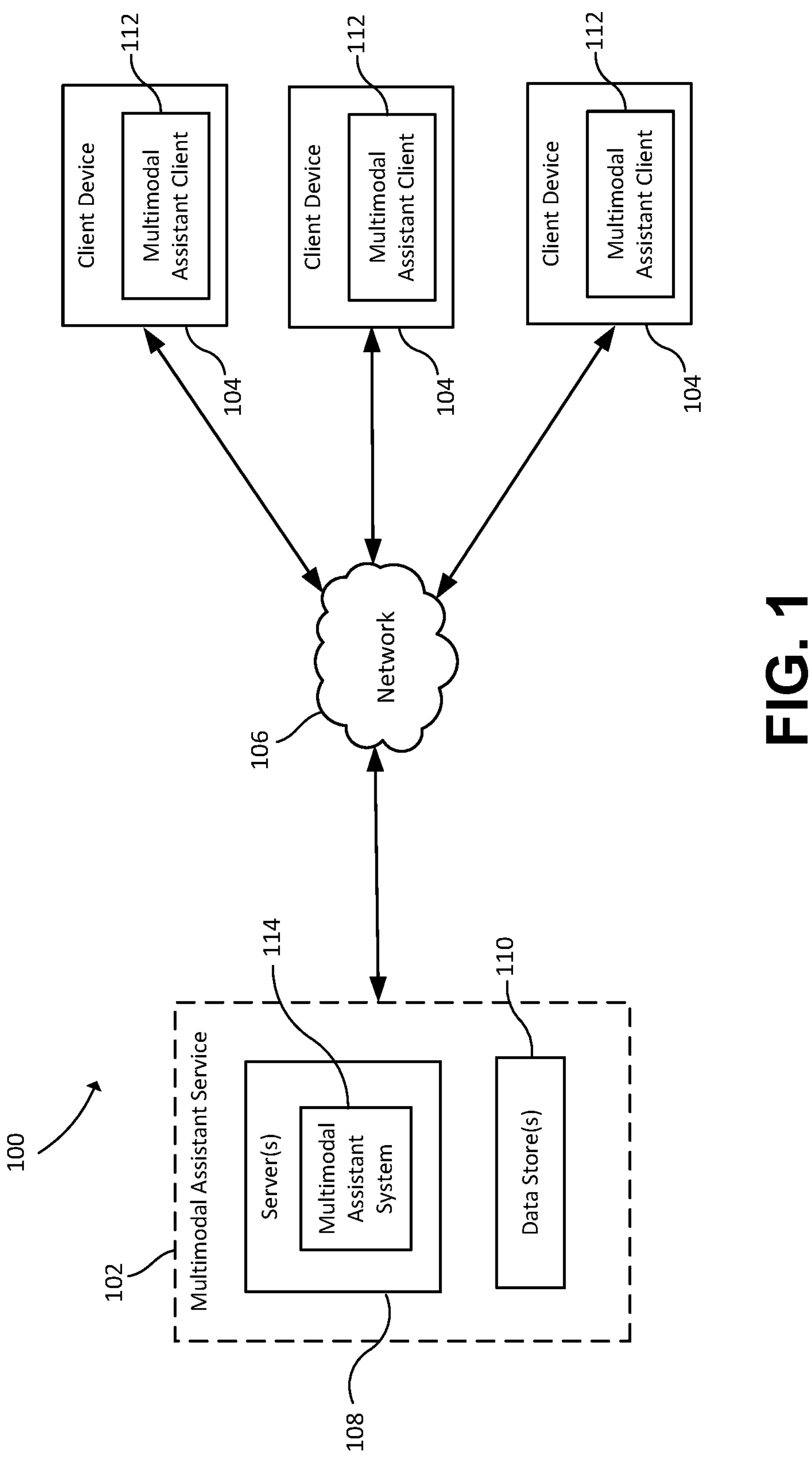
FIG. 1 is a diagram showing an example computing environment in which aspects of the disclosure may be implemented.

A multimodal large language model (MLLM) (also referred to as a large multimodal model (LMM)) is a type of artificial intelligence (AI) model that is designed to understand and generate content across multiple modalities, where a modality refers to a distinct form of communication or representation. In the context of multimodal language models, the modalities typically include text, images, and sometimes other forms of data such as audio or video. The term "multimodal" indicates that the model can effectively process and/or generate information based on multiple modalities (e.g., typically text and image) enabling it to comprehend and generate content that involves different types of data simultaneously. This is particularly useful for tasks that require understanding and generating content based on a combination of textual and visual information. Multimodal language models can be applied in a variety of domains, such as image captioning, visual question answering, and any task that involves both textual and visual elements.

While MLLMs are effective at performing many multimodal tasks (such as captioning images, detection, segmentation, and the like), enabling MLLMs to solve structured reasoning tasks (e.g., solving multi-step problems and complex problems) has remained a challenge. One method that has been used to improve the ability of LLMs to handle structured reasoning tasks is the integration of Chain of Thought (CoT) reasoning. CoT reasoning refers to an approach that causes a model to break down a problem into a series of intermediate steps. The two primary ways of integrating CoT reasoning into LLMs include: (1) instruction fine-tuning and (2) prompt engineering. In various implementations, instruction fine-tuning involves fine-tuning an LLM using machine-generated instruction-following data. While effective, instruction fine-tuning requires significant amounts of time, computing resources, and training data.

CoT prompting engineering is a technique that involves adding instructions to the prompt for guiding an LLM to follow a reasoning process when dealing with complex problems. For example, an instruction could be included with a prompt to have the model "solve the problem step by step." CoT prompting has been shown to improve LLM performance on a range of arithmetic, commonsense, and symbolic reasoning tasks. CoT prompting avoids the costs associated with instruction fine-tuning in integrating CoT reasoning into LLMs. However, the CoT prompting used to integrate CoT reasoning into unimodal LLMs is not as effective when used in the multimodal context. Multimodal tasks require the integration of visual information which is not elicited by simply instructing a model to solve a problem step by step.

To address the technical problems associated with improving the ability of MLLMs to perform structured reasoning tasks, this description provides technical solutions in the form of an improved system and method for eliciting CoT reasoning in MLLMs (e.g., GPT-4V) that involves prompting the model to perform a three-step reasoning process, called visual Chain-of-Thought (v-CoT), to solve problems. A MLLM receives a multimodal prompt as input that includes an image and a natural language task description which describes a structured task to be performed based on the image. In v-CoT, a v-CoT instruction is integrated into the prompt (e.g., by appending, concatenation, etc.) for instructing the model to (1) extract relevant information about the image conditioned on the image and the natural language problem description, (2) use this relevant information to reason about the problem, and (3) state the final answer. It should be noted that step (1) is not the same as a regular image captioning step, as it is also conditioned on both the image and the associated task description.

In various implementations, the multimodal prompt is provided to a v-CoT prompt generating component which combines the image, the natural language task description, and the v-CoT instruction into a v-CoT prompt that is structured and formatted in a manner that is understandable by the MLLM. An aspect includes a system for providing a digital assistant capable of handling v-CoT for structured reasoning tasks that include visual inputs and to produce tangible results from the tasks. The tangible results including answers to input questions as well as the reasoning that led to the answers. Another aspect includes a canonical user experience for a digital assistant for handling structured reasoning tasks in a novel visual CoT manner based on a combination of vision capabilities as described above. In some implementations, the MLLM is an LLM with vision, such as GPT-4V, and uses more the 1 billion parameters.

The technical solutions described herein address the problems and shortcomings of existing CoT approaches in handling structured reasoning tasks in domains that include visual inputs and reasoning tasks that are not part of the training data, such as mathematical questions with visual context, questions about data analysis points found in images (e.g., charts, graphs, tables), abstraction and reasoning problems over objects in grids, code generation tasks (where code is treated similar to images), and the like. The technical solutions solve the problems by using v-CoT prompting to cause the model to extract features from the input image which are relevant to the task to be performed and generate natural language descriptions of the extracted features which the model then uses to reason about the task to be performed and generate a final response/answer. As discussed below, the v-CoT prompting scheme used with a MLLM, such as GPT-4V, yields significant improvements in handling structured reasoning problems over other techniques/models in handling multimodal structured reasoning tasks.

FIG. 1 shows an example computing environment 100 in which aspects of the disclosure may be implemented. The computing environment 100 includes a multimodal assistant service 102 and client devices 104 which communicate with each other via a network 106. The network 106 includes one or more wired, wireless, and/or a combination of wired and wireless networks. In some implementations, the network 106 includes one or more local area networks (LAN), wide area networks (WAN) (e.g., the Internet), public networks, private networks, virtual networks, mesh networks, peer-to-peer networks, and/or other interconnected data paths across which multiple devices may communicate. In some examples, the network 106 is coupled to or includes portions of a telecommunications network for sending data in a variety of different communication protocols. In some implementations, the network 106 includes Bluetooth® communication networks or a cellular communications network for sending and receiving data including via short messaging service (SMS), multimedia messaging service (MMS), hypertext transfer protocol (HTTP), direct data connection, WAP, email, and the like.

The multimodal assistant service 102 may be implemented as a cloud-based service or set of services. To this end, the multimodal assistant service 102 is executed on or includes at least one server 108 which is configured to provide computational and/or storage resources for implementing the multimodal assistant service 102. The server 108 is representative of any physical or virtual computing system, device, or collection thereof, such as, a web server, rack server, blade server, virtual machine server, or tower server, as well as any other type of computing system used to implement the multimodal assistant service 102. Servers are implemented using any suitable number and type of physical and/or virtual computing resources (e.g., standalone computing devices, blade servers, virtual machines, etc.). Multimodal assistant service 102 may also include one or more data stores 110 for storing data, programs, and the like for implementing and managing the multimodal assistant service 102. In FIG. 1, one server 108 and one data store 110 are shown, although any suitable number of servers and/or data stores may be utilized.

Client devices 104 enable users to access the services provided by the multimodal assistant service 102 via the network 106. Client devices 104 can be any suitable type of computing device, such as personal computers, desktop computers, laptop computers, smart phones, tablets, gaming consoles, smart televisions and the like. Client devices 104 include at least one multimodal assistant client application 112 that is configured to interact with the multimodal assistant service 102. Examples of multimodal assistant client applications include text editors, code editors, word processing programs, integrated development environments (IDEs), and the like. In various implementations, client application 112 is a dedicated application installed on the client device and programmed to interact with one or more services provided by cloud infrastructure. In some implementations, client application 112 is an add-on, extension, or the like that can be integrated into other applications to enable interaction with the multimodal assistant service 102. In some cases, client application 112 is a general-purpose application, such as a web browser, configured to access services and/or applications over the network 106.

The multimodal assistant service 102 includes a multimodal assistant system 114 for providing multimodal assistant services to clients. In accordance with this disclosure, the multimodal assistant system 114 includes a MLLM model with v-CoT reasoning that receives multimodal inputs, which in this case include natural language task description and image inputs, and generates a natural language text output conditioned on the natural language task description, the image, and a natural language v-CoT instruction. The v-CoT instruction is designed to cause the model to (1) extract relevant information about the image conditioned on the image and the natural language problem description, (2) use this relevant information to reason about the problem, and (3) generate the final answer.

Figure 2:
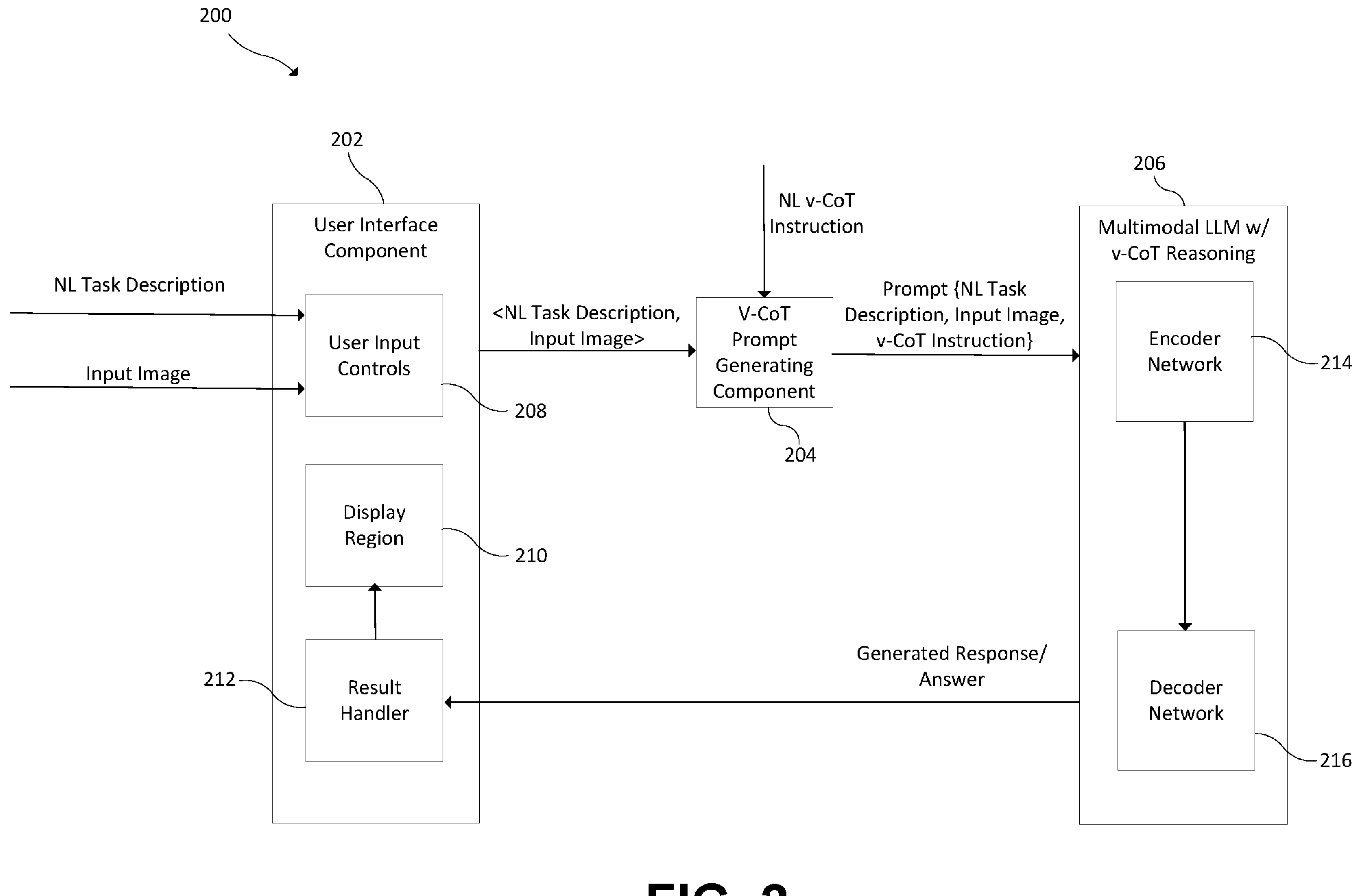
FIG. 2 depicts an example implementation of a multimodal assistant system which may be implemented in a computing environment, such as the computing environment of FIG. 1.

An example implementation of a multimodal assistant system 200 is shown in FIG. 2. The multimodal assistant system 200 includes a user interface (UI) component 202, a v-CoT prompt generating component 204, and a multimodal assistant model 206. The UI component 202 is a software program executed on a computing device, such as a client device, which enables a user to connect to and interact with the multimodal assistant system 200. The UI component 202 includes user input controls 208 which enable user input in the form of an input image and a natural language task description to be entered into the system 200. The natural language task description describes a task to be performed based on the input image. User input may be provided via a user input device, such as a keyboard, touch input, voice input, and the like. The UI component 202 also includes a display region 210 for displaying the output and responses returned by the multimodal assistant system and a result handler 212 which receives the output of the multimodal assistant service that is generated in response to a prompt and causes the output to be displayed in the display region 210. The UI component 202 is configured to communicate natural language prompts to the multimodal assistant model 206.

The prompt generating component 204 receives the input image, the natural language task description, and a natural language v-CoT instruction as inputs and combines the inputs, e.g., by appending, concatenating, structuring, to form a v-CoT prompt having a structure/format understandable by the MLLM 206. The natural language v-CoT instruction is worded to cause the model to perform a three-step reasoning process to generate a response/answer to the task provided as input that includes: extracting relevant information about the image (conditioned on the image and the natural language task description), and using the extracted relevant information to reason about the problem before generating a final answer. The v-CoT prompt is provided to the MLLM 206 as input.

Figure 3:
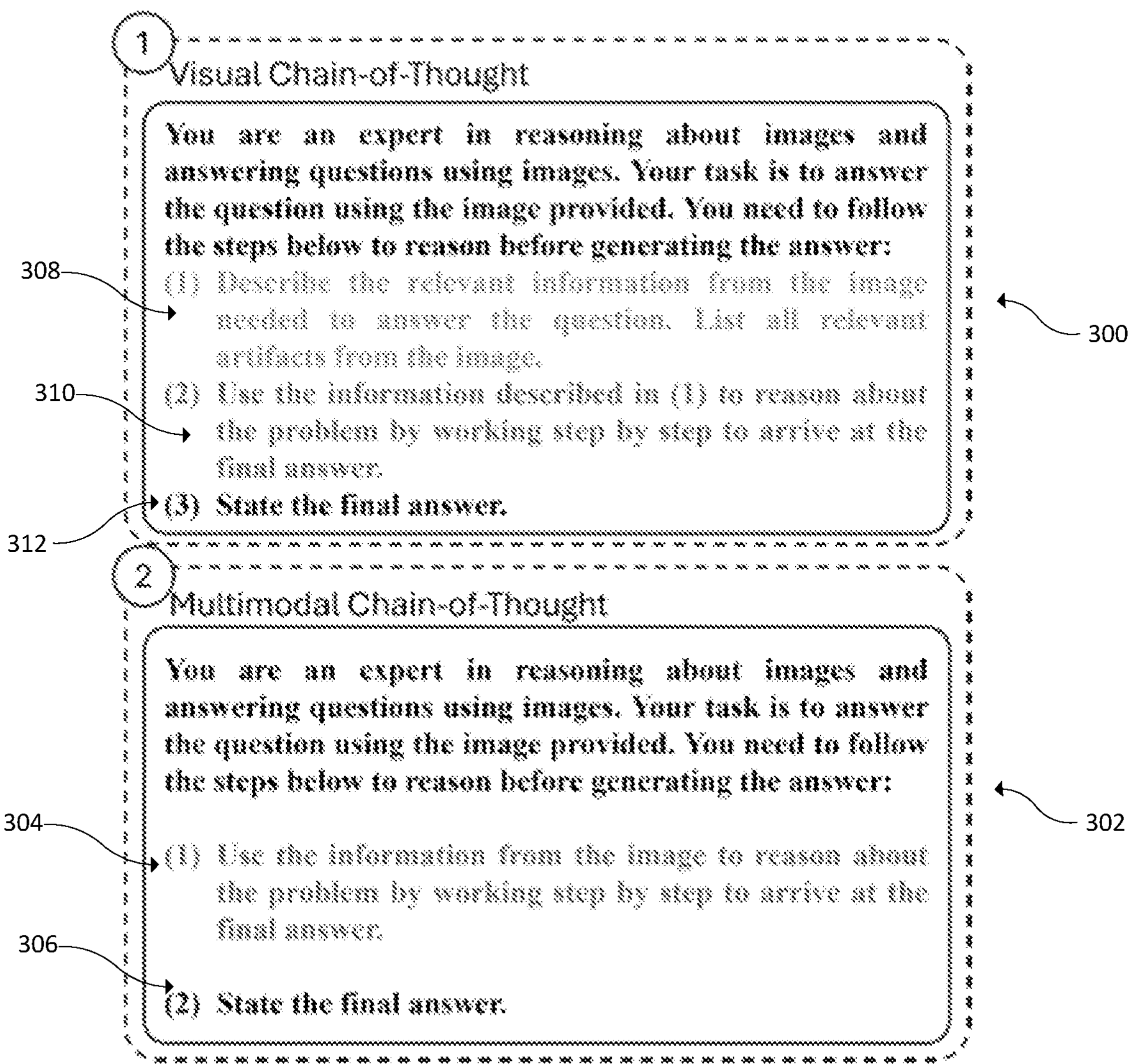
FIG. 3 shows an example prompt structure for v-CoT and m-CoT prompts.

Referring to FIG. 3, an example of a structure of a v-CoT prompt 300 and an m-CoT prompt 302 are shown. The m-CoT prompt 302 includes a natural language description of the task to be performed with reference to an input image (not shown). The natural language description lists two steps to follow to reason before generating the answer: (1) step 304 is the instruction for causing the model to simulate reasoning on the input image and the task description (i.e., "Use the information from the image to reason about the problem by working step by step to arrive at the final answer."); and (2) step 306 which is the instruction to generate the output (e.g., "State the final answer). The v-CoT prompt 300 is similar to the m-CoT prompt 302 but includes the initial step 308 of instructing the model to extract relevant information from the image conditioned on the image and the task description (i.e., "Describe the relevant information from the image needed to answer the question. List all relevant artifacts from the image."), followed by an instruction 310 for causing the model to simulate reasoning on the extracted relevant information/artifacts (i.e., "Use the information described in (1) to reason about the problem by working step by step to arrive at the final answer."). The prompt 300 also includes an instruction 312 which is the instruction to generate the output (e.g., "State the final answer).

Figure 4:
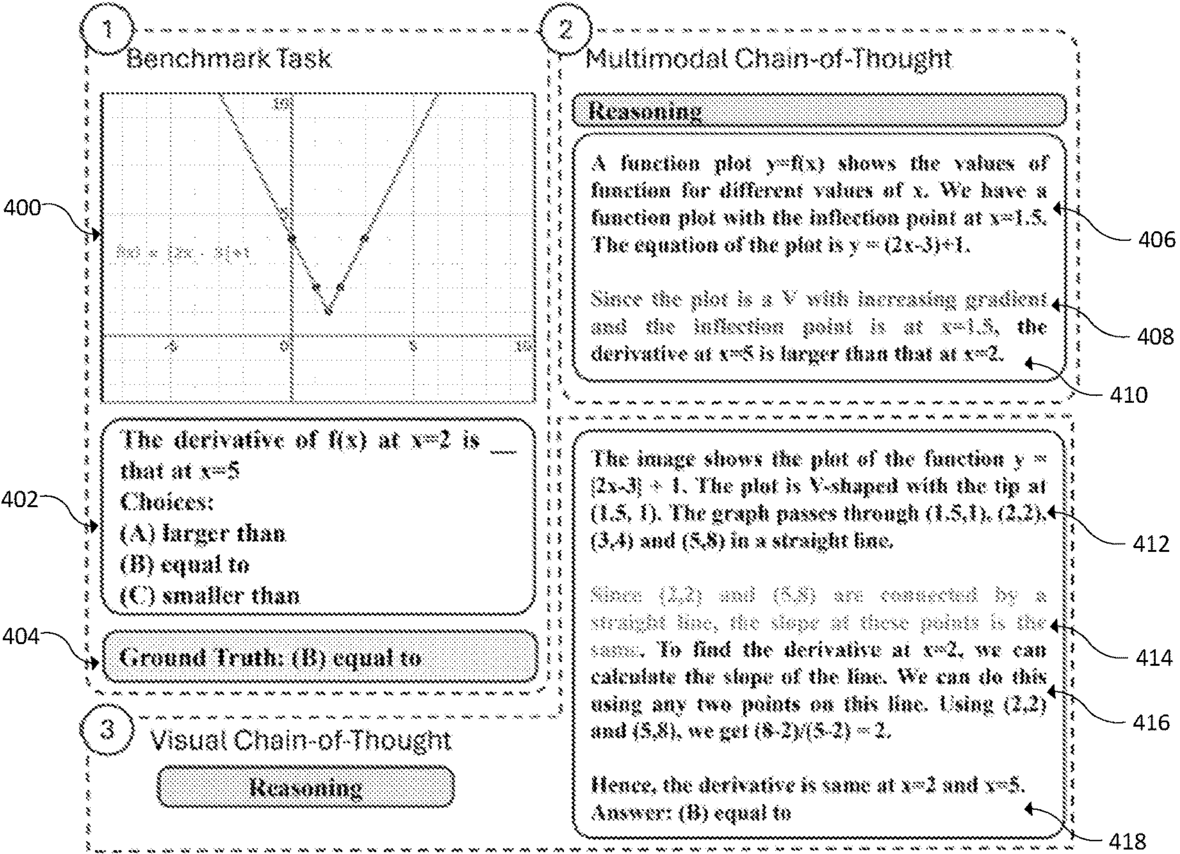
FIG. 4 shows an example task and the output generated by a multimodal LLM with m-CoT prompting and v-CoT prompting.

FIG. 4 schematically shows a training example (1) which includes an input image 400, natural language task description 402, and ground truth output 404 (e.g., the target response). In this case, the image is a graph of the function $f(x)=(2x-3)+1$. The task description includes a fill in the blank problem asking whether the derivative of $f(x)$ at x=2 is (A) larger than, (B) equal to, or (C) smaller than $f(x)$ at x=5. The ground truth response is "(B) equal to." The example also shows the output (2) generated based on m-CoT prompting (as described above). In this case, the output includes a natural language description 406 of the image, the rationale 408 used to solve the problem 402, and the final answer 410 generated by the model based on the rationale 408 and the image description 406. As noted above, m-CoT uses a two-stage process for CoT reasoning that includes: 1) processing the input image and the task description to generate a description of the rationale for solving the problem, and 2) processing the input image 400, the task description 402, and the rationale 408 to generate a final output 410. In this case, the rationale 408 generated to solve the problem is incorrect which results in an incorrect final answer. This could happen, for example, if the image type and/or reasoning type for the problem was not seen in training data for the model.

The example also shows the output (3) of the MLLM generated based on v-CoT prompting. In this case, output includes a natural language description 412 of the image features/artifacts from image 400 which the model has determined are necessary to answer the problem 402. The output also includes a statement of the reasoning steps 414 used by the model to generate a response to the problem 402, and a statement of the final answer 418 generated by the model. The v-CoT prompt makes two changes: (1) it instructs the model to describe relevant information and relevant image artifacts required to answer the question, and then (2) it asks the model to reason about this information to obtain the final answer. The extracted features/artifacts act like predicates that can be used by the model to reason over the image to solve the task, and can range from concrete values shown in the image to abstract concepts derived/inferred from other image features/artifacts. FIG. 4 shows an example where the model first identifies the points the line passes through even when this is not explicitly stated in the image. This information is used during reasoning to determine the slope of the line which in turn enables a correct determination of the derivative of f(x) at x=2 and x=5.

Referring again to FIG. 2, the MLLM receives the prompt as an input and includes an encoder network 214 and a decoder network 216 for processing the prompt to generate a response/answer which is returned to the result handler 212. The MLLM may have any suitable architecture for processing multimodal (i.e., text and image) inputs to generate natural language text outputs. In the example of FIG. 2, the MLLM includes an encoder network for encoding the image and the natural language text of the prompt and a decoder network for generating a natural language response/answer based on the prompt.

Figure 5:
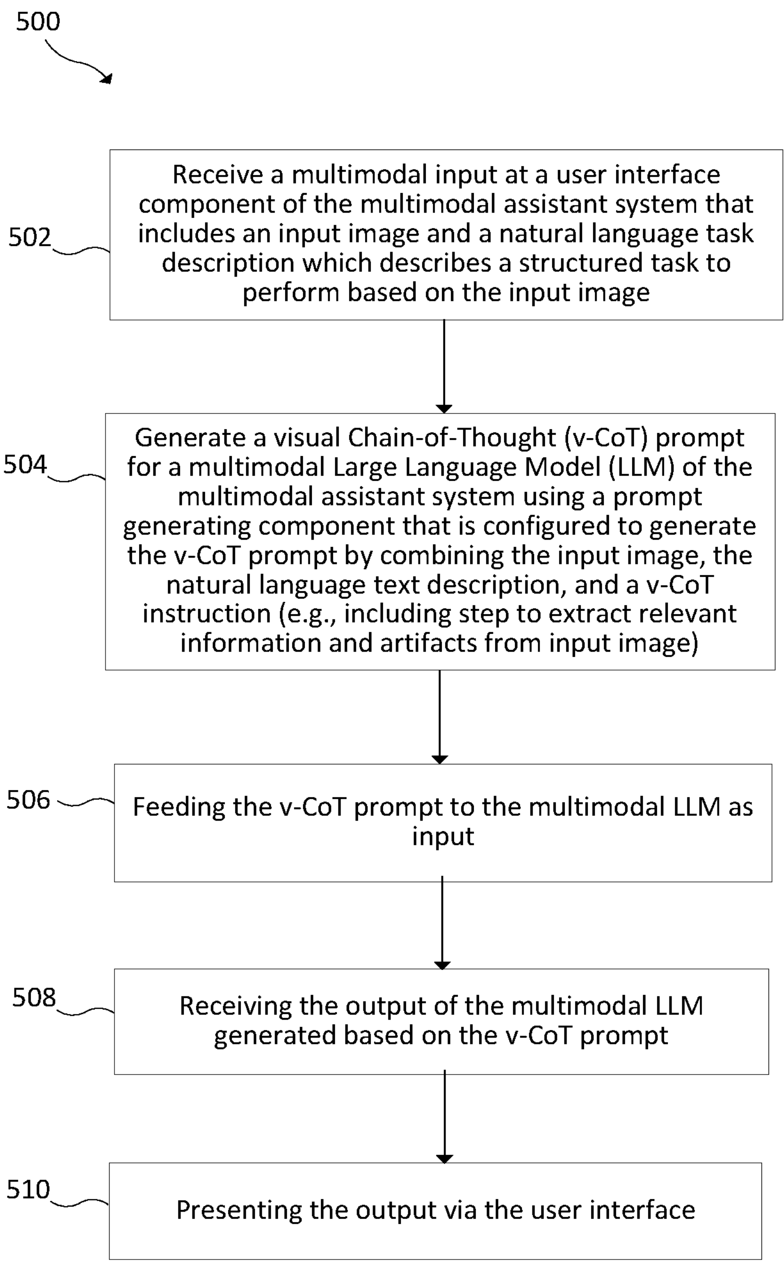
FIG. 5 shows a flowchart of an example method of eliciting Chain-of-Thought reasoning in a multimodal large language model (LLM).

A flowchart for an example method 500 of generating code using a multimodal assistant system according to this disclosure is shown in FIG. 5. The method begins with receiving a multimodal input at a user interface component of the multimodal assistant system that includes an input image and a natural language task description which describes a structured task to perform based on the input image (block 502). A visual Chain-of-Thought (v-CoT) prompt for a multimodal Large Language Model (LLM) of the multimodal assistant system is then generated using a prompt generating component that is configured to generate the v-CoT prompt by combining the input image, the natural language text description, and a v-CoT instruction (block 504). The v-CoT instruction defines a series of steps for the MLLM to take in generating an output that solves the task conditioned on the input image and the natural language task description and that utilizes CoT reasoning. The series of steps includes instructing the MLLM to describe relevant information derived from the image and relevant image artifacts required to generate the output; instructing the MLLM to reason over the relevant information and relevant image artifacts to determine a solution for the task; and including the solution in the output. The v-CoT prompt is then fed to the MLLM as input (block 506), and the output generated by the MLLM based on the v-CoT prompt is received in return (block 508). The output is then presented on the user interface (block 510).

The performance of MLLM with v-CoT prompting was evaluated relative to a plurality of baselines. The baselines are divided into three categories: (1) multimodal prompting strategies (m-CoT and v-CoT), (2) directly using large instruction-tuned vision-text models, and (3) captioning with instruction-tuned models plus reasoning over these captions with GPT-4. As noted above, multimodal prompting schemes were used with GPT-4V during evaluations.

Sphinx, Blip2, and InstructBlip are instruction-tuned vision-text models. Sphinx is a large multi-modal model (LMM) with multi-purpose visual instruction-following capabilities. Sphinx has been trained on a variety of vision and language alignment tasks like object detection, visual question answering and region level captioning and achieves state-of-the-art performance on these. Blip2 is a text and image pre-training technique that bootstraps vision-language pre-training from off-the-shelf frozen pre-trained image encoders and frozen large language models. The model combines existing vision and language models and pre-trains them on language and vision alignment tasks. Blip2 has been trained on various image-language tasks like conditional image captioning. InstructBlip is an extension that applies instruction tuning to Blip2 for language and vision tasks like visual question answering.

InstructBlip+GPT-4 with traditional CoT and Program-of-thought (PoT) prompting of GPT-4 were selected to use as baselines for captioning and prompting. CoT and PoT have shown state-of-the-art performance in text and code generation tasks. To incorporate images, a caption for the image is generated first using InstructBlip, and the caption is added to the input prompt for GPT-4 along with instructions for CoT or POT reasoning.

The MLLM with v-CoT reasoning and the selected baselines were evaluated in four domains using a large variety of benchmarks. The four domains include: (1) Mathematical questions with visual context from the Math Vista dataset, (2) Questions about data charts from the ChartQA dataset, (3) Abstraction and reasoning problems over objects in grids from the ARC dataset, and (4) Code generation problems involving generating SQL statements based on a rendered table from the Spider dataset. The table shown in FIG. 6 summarizes the four benchmarks. To mitigate computational costs, 20% of tasks were sampled uniformly at random from each dataset.

Mathematical reasoning was evaluated on a visual context using the introduced MathVista dataset. These problems require reasoning over images which may contain diagrams, tables or other images. Each task consists of an image and question pair. Questions in Math Vista can be multiple-choice, free-form with single value as a result, or free-form with a list as a result. Tasks from the testmini split of Math Vista were sampled which resulted in multiple choice and single-value free-form questions.

The ability to answer questions based on charted data—an important skill for visual data analysis—was evaluated using the ChartQA dataset. Each task in this dataset consists of a plot as a rendered image and a question about this plot. The questions are short and objective, with two-to-three-word answers or numeric value answers. An example question is "How many crimes were committed in 2020?" The question is passed in the prompt, preceded by the following instruction: "Answer the question using the image. Only give the exact answer in 2-3 words or as a numeric value."

The ability of multimodal models to solve program—synthesis-like tasks over grids that require abstraction and extrapolation were evaluated using the ARC dataset. Each ARC task consists of a set of examples, where an example consists of an input and output grid, and a new input—the model should predict the associated output grid. Grids are represented as comma-separated-value (CSV) table of integers. The following instruction is used: "Generate the transformed representation that will replace the question mark by looking at the example figure transformation. Generate as a <gridsize> Grid where 0 denotes black, 1 denotes red and 2 denotes blue." where we replace <gridsize> with the corresponding dimensions specified in the individual benchmark task.

Code generation in the form of NL-to-SQL generation was evaluated in a multi-modal setting using the Spider dataset. Each task input consists of a relational database and natural language question pair, and the task output is the SQL code needed to answer that question. To turn Spider tasks into multi-modal tasks, the tasks are considered over a single table and the first 50 rows of the table are rendered into an image using a suitable table to image converter, such as matplotlib.pyplot.table. The following instruction was used: "Generate SQL query for the given user question. The relevant table is shown in the image and the metadata is included.

Metadata: <Metadata>

Question: <Question> where we replace <MetaData> with the table schema (column names and types) and <Question> with the user question. The schema encoding from FormaT5 was used for encoding. Note that only GPT-4-based models were evaluated on this problem, as other baseline methods have not been trained to generate code.

The table shown in FIG. 7 presents a summary of the results across benchmarks and baselines. In the table, InstructBlip+GPT-4 indicates captioning by InstructBlip and reasoning over this by text GPT-4. CoT represents Chain-of-Thought, and POT represents Program-of Thought. GPT-4 does not use a vision component and was only evaluated on problems that do not depend on an image. It was found that vanilla GPT-4V outperforms other baselines for Math Vista and ChartQA, while GPT-4V with v-CoT improves 1.5-9.3% over vanilla GPT-4V on these benchmarks. Interestingly, for the ARC dataset, it was observed that using the multimodal version of GPT-4 actually produces worse results, compared to generating textual descriptions and then applying GPT-4 plus CoT or POT (the latter of which improves results most). Overall, the ARC dataset represents a challenging task. On the Spider dataset, it was found that including images (i.e., GPT-4V) improves performance by 0.8% points, while adding v-CoT improves performance by 1.9%.

Figure 8:
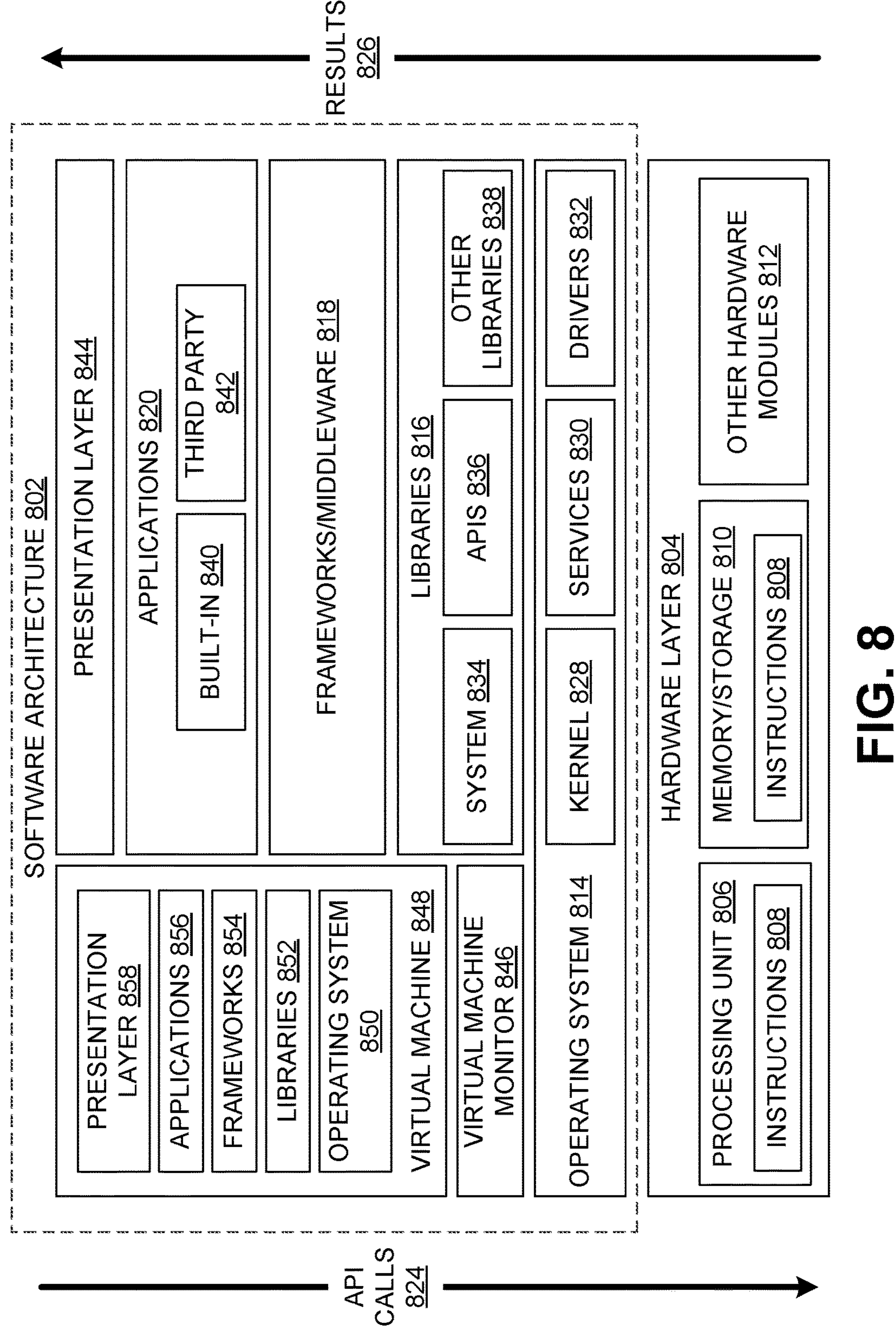
FIG. 8 is a block diagram illustrating an example software architecture, various portions of which may be used in conjunction with various hardware architectures herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
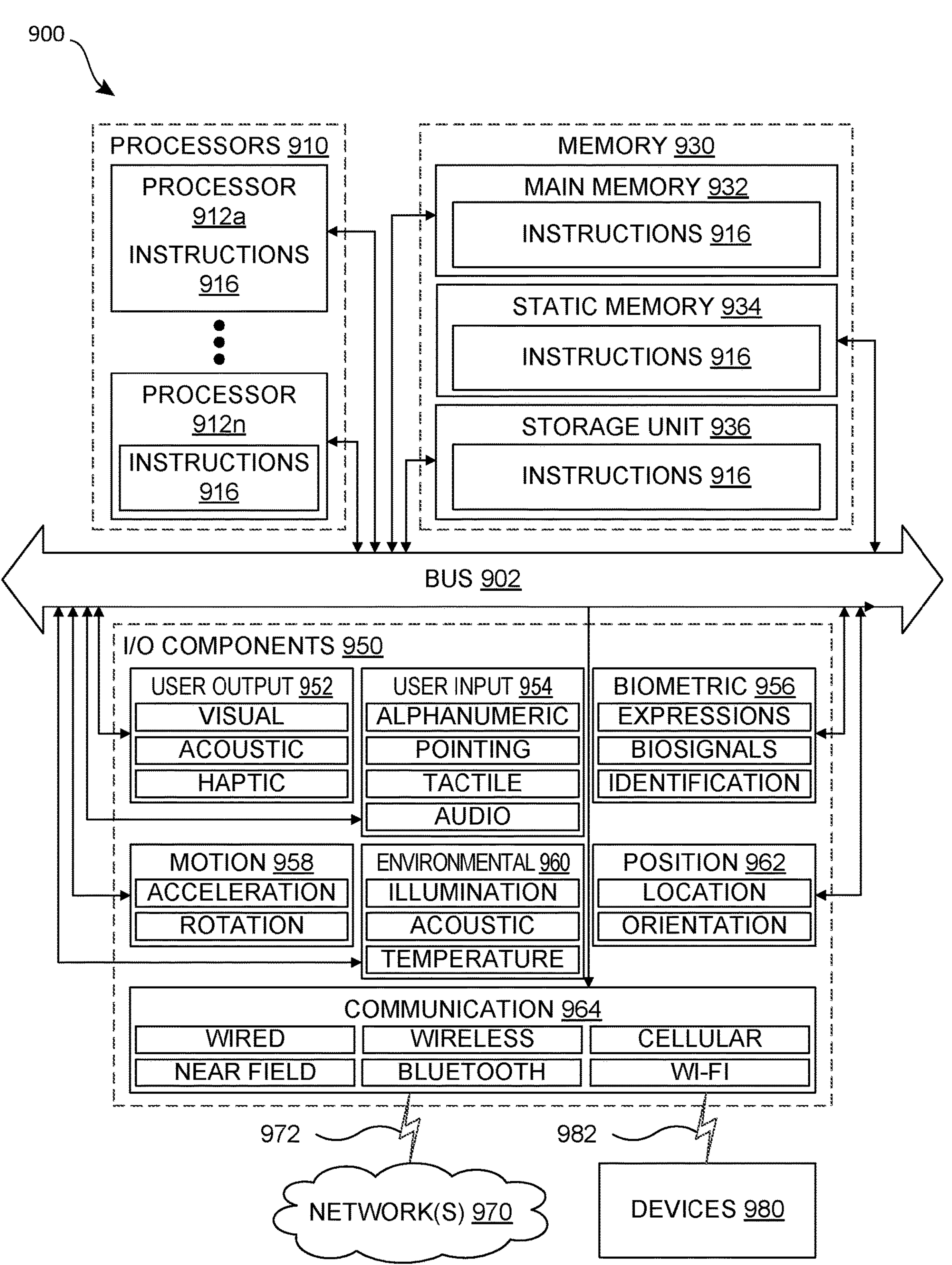
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors **912*a* to 912*n* that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900** may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or each memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, each memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 964, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A multimodal assistant system comprising:

a processor; and a memory in communication with the processor, the memory comprising executable instructions that, when executed by the processor alone or in combination with other processors, cause the multimodal assistant system to perform functions of:

receiving a multimodal input at a user interface component of the multimodal assistant system, the multimodal input including an input image and a natural language task description which describes a structured task to perform based on the input image;

generating a visual Chain-of-Thought (v-CoT) prompt for a multimodal Large Language Model (MLLM) of the multimodal assistant system using a prompt generating component, the prompt generating component generating the v-CoT prompt by combining the input image, the natural language task description, and a v-CoT instruction, the v-CoT instruction defining a series of steps for the MLLM to take in generating an output that solves the task conditioned on the input image and the natural language task description and that utilizes CoT reasoning, the series of steps including:

instructing the MLLM to describe relevant information derived from the image and relevant image artifacts required to generate the output;

instructing the MLLM to reason over the relevant information and relevant image artifacts to determine a solution for the task; and including the solution in the output;

providing the v-CoT prompt to the MLLM as an input;

receiving the output generated by the MLLM based on the v-CoT prompt; and presenting the output on the user interface for the multimodal assistant system.

2. The multimodal assistant system of claim 1, wherein the MLLM is trained to process text and image input modalities.

3. The multimodal assistant system of claim 2, wherein the MLLM has 1 billion parameters or more.

4. The multimodal assistant system of claim 3, wherein the MLLM is a GPT-4V model.

5. The multimodal assistant system of claim 1, wherein the MLLM is trained to derive relevant information from the input image that is not explicitly shown in the input image.

6. The multimodal assistant system of claim 1, wherein the structured task to be performed includes a mathematical reasoning task using visual context derived from the input image.

7. The multimodal assistant system of claim 1, wherein the structured task to be performed includes one of a visual data analysis task of charted data included in the input image and a visual abstraction and extrapolation task over objects in a grid included in the input image.

8. The multimodal assistant system of claim 1, wherein the structured task to be performed includes a code generation task that involves generating SQL from the natural language task description over a table rendered in the input image.

9. A method of eliciting Chain-of-Thought reasoning from a multimodal Large Language model (MLLM) of a multimodal assistant system, the method comprising:

receiving a multimodal input at a user interface component of the multimodal assistant system, the multimodal input including an input image and a natural language task description which describes a structured task to perform based on the input image;

generating a visual Chain-of-Thought (v-CoT) prompt for the MLLM of the multimodal assistant system using a prompt generating component, the prompt generating component generating the v-CoT prompt by combining the input image, the natural language task description, and a v-CoT instruction, the v-CoT instruction defining a series of steps for the MLLM to take in generating an output that solves the task conditioned on the input image and the natural language task description and that utilizes CoT reasoning, the series of steps including:

instructing the MLLM to describe relevant information derived from the image and relevant image artifacts required to generate the output;

instructing the MLLM to reason over the relevant information and relevant image artifacts to determine a solution for the task; and including the solution in the output;

providing the v-CoT prompt to the MLLM as an input;

receiving the output generated by the MLLM based on the v-CoT prompt; and presenting the output on the user interface for the multimodal assistant system.

10. The method of claim 9, wherein the MLLM is trained to process text and image input modalities.

11. The method of claim 10, wherein the MLLM has 1 billion parameters or more.

12. The method of claim 11, wherein the MLLM is a GPT-4V model.

13. The method of claim 9, wherein the MLLM is trained to derive relevant information from the input image that is not explicitly shown in the input image.

14. The method of claim 9, wherein the structured task to be performed includes a mathematical reasoning task using visual context derived from the input image.

15. The method of claim 9, wherein the structured task to be performed includes one of a visual data analysis task of charted data included in the input image and a visual abstraction and extrapolation task over objects in a grid included in the input image.

16. The method of claim 9, wherein the structured task to be performed includes a code generation task that involves generating SQL from the natural language task description over a table rendered in the input image.

17. A non-transitory computer readable medium on which are stored instructions that, when executed, cause a programmable device to perform functions of:

receiving a multimodal input at a user interface component of a multimodal assistant system, the multimodal input including an input image and a natural language task description which describes a structured task to perform based on the input image;

generating a visual Chain-of-Thought (v-CoT) prompt for a multimodal Large Language Model (MLLM) of the multimodal assistant system using a prompt generating component that is configured to generate the v-CoT prompt by combining the input image, the natural language task description, and a v-CoT instruction, the v-CoT instruction defining a series of steps for the MLLM to take in generating an output that solves the task conditioned on the input image and the natural language task description and that utilizes CoT reasoning, the series of steps including:

instructing the MLLM to describe relevant information derived from the image and relevant image artifacts required to generate the output;

instructing the MLLM to reason over the relevant information and relevant image artifacts to determine a solution for the task; and including the solution in the output;

feeding the v-CoT prompt to the MLLM as input;

receiving the output generated by the MLLM based on the v-CoT prompt; and presenting the output on the user interface for the multimodal assistant system.

18. The non-transitory computer readable medium of claim 17, wherein the structured task to be performed includes a mathematical reasoning task using visual context derived from the input image.

19. The non-transitory computer readable medium of claim 17, wherein the structured task to be performed includes one of a visual data analysis task of charted data included in the input image and a visual abstraction and extrapolation task over objects in a grid included in the input image.

20. The non-transitory computer readable medium of claim 17, wherein the structured task to be performed includes a code generation task that involves generating SQL from the natural language task description over a table rendered in the input image.

* * * * *